US012374801B1

(12) United States Patent
Harris

(10) Patent No.: US 12,374,801 B1
(45) Date of Patent: Jul. 29, 2025

(54) CERAMIC FREQUENCY SELECTIVE SURFACE

(71) Applicant: Northeastern University, Boston, MA (US)

(72) Inventor: Vincent Harris, Sharon, MA (US)

(73) Assignee: Northeastern University, Boston, MA (US)

( * ) Notice: Subject to any disclaimer, the term of this patent is extended or adjusted under 35 U.S.C. 154(b) by 133 days.

(21) Appl. No.: 18/118,740

(22) Filed: Mar. 7, 2023

Related U.S. Application Data

(60) Provisional application No. 63/317,533, filed on Mar. 7, 2022.

(51) Int. Cl.
*H01Q 15/00* (2006.01)
*H01Q 1/28* (2006.01)

(52) U.S. Cl.
CPC ......... *H01Q 15/0086* (2013.01); *H01Q 1/282* (2013.01)

(58) Field of Classification Search
USPC .......................................................... 343/702
See application file for complete search history.

(56) References Cited

FOREIGN PATENT DOCUMENTS

CN 105206904 A * 12/2015
CN 108565557 A * 9/2018
CN 107734948 A * 12/2018 ........... H05K 9/0081

OTHER PUBLICATIONS

Kenion, T. et al., “Dielectric and mechanical properties of hypersonic radome materials and metamaterial design: A review”, Journal of the European Ceramic Society, vol. 42, Issue 1, 2022, pp. 1-17.
Munro, R.G., “Material Properties of a sintered α-SiC”, J. Phys. Chem. Ref. Data, (1997), vol. 26, No. 5, pp. 1195-1203.
Loehman, R. et al., “Ultra High Temperature Ceramics for Hypersonic Vehicle Applications”, Sandia Report Sand 2006-2925 Unlimited Release Printed Jun. 2006, Sandia National Laboratories, Albequerque, New Mexico, 46 pgs.
Yang, H, et al., “Microwave and conventional sintering of SiC/SiC composites: Flexural properties and microstructures”, Ceramics International, vol. 41, Issue 9, Part B, 2015, 11651-11654.
Medding, J.A. “Nondestructive Evaluation of Zirconium Phosphate Bonded Silicon Nitride Radomes”, Doctoral dissertation, Virginia Tech, Blacksburg, Virginia, (1996).
Introduction to Copper: Fact Sheet, (2021) Retrieved online from https://www.copper.org/publications/newsletters/innovations/2001/08/intro_fac.html.

(Continued)

*Primary Examiner* — Dimary S Lopez Cruz
*Assistant Examiner* — Brandon Sean Woods
(74) *Attorney, Agent, or Firm* — Verrill Dana, LLP

(57) ABSTRACT

An all-ceramic frequency selective surface (ACFSS) material is provided for use in high temperature environments where there is a need for selective transmission of a defined wavelength band of electromagnetic radiation through the material. Unlike traditional frequency selective surfaces that use metals to form a structured or patterned layer that defines the passband, the present ACFSS material uses electrically conductive ceramic materials to form the patterned layer, giving the material a much greater heat stability than metal-containing frequency selective surface materials.

16 Claims, 4 Drawing Sheets

(56) References Cited

OTHER PUBLICATIONS

Kan, W.H. et al., "Challenges and prospects of Anodes for solid oxide fuel cells", Ionics (2015) 21:301-318.

Mogensen, M. et al., "Physical, chemical and electrochemical properties of pure and doped ceria", Solid State Ionics, 129, (2000), pp. 63-94.

Steeves, M. M., "Electronic Transport Properties of Ruthenium and Ruthenium Dioxide Thin Films", Electronic Theses and Dissertations. 262 (2011), The University of Maine, Orono, Maine.

Glassford, K.M. et al., "Electron transport properties in RuO2 rutile", Phys. Rev. B., 49, 11, (1994), pp. 7107-7114.

Ryden, W. D. et al., "Electrical Transport Properties of IrO2 and RuO2", Phys. Rev. B, vol. 1, No. 4, (1970), pp. 1494-1500.

Kim, M. et al., Analysis of an electromagnetic mitigation scheme for reentry telemetry through plasma. J. Spacecr. Rockets, (2008), 45, 6, pp. 1223-1229.

Jung, M. et al., "Reentry blackout prediction for atmospheric reentry demonstrator mission considering uncertainty in chemical reaction rate model", Phys. Plasmas, (2018), 25, 12 pgs.

Pendry, J.B. et al., "Low frequency plasmons in thin-wire structures". J. Phys. Condens. Matter, (1998), 10, pp. 4785-4809.

Chen, H-T. et al., "A review of metasurfaces: physics and applications," 2016 Rep. Prog. Phys., 79, 41 pgs.

Panwar. R et al., "Progress in frequency selective surface-based smart electromagnetic structures: A critical review," Aerospace Science and Technology, 66, (2017), pp. 216-234.

Ziolkowski, R.W. et al., "Introduction, History, and Selected Topics in Fundamental Theories of Metamaterials" In Metamaterials Physics and Engineering Explorations, 1st ed.; IEEE Press: Piscataway, NJ, USA, (2006); pp. 5-10.

Saxena M. et al., "Metal-like electrical conductivity in LaxSr2-xTiMoO6 oxides for high temperature thermoelectric power generation", Dalton Trans., (2017), 46, pp. 5872-5879.

Maschio S. et al., "Mechanical Properties in the Ceria-Zirconia System", J. Eur. Ceram. Soc. 9 (1992), pp. 127-132.

Rybak, J.P., "Causes, Effects and Diagnostic Measurements of the Reentry Plasma Sheath", Colorado State University, Department of Electrical Engineering, Fort Collins, Colorado, (1970), 66 pgs.

* cited by examiner

CERAMIC FREQUENCY SELECTIVE SURFACE

CROSS-REFERENCE TO RELATED APPLICATIONS

This application claims priority to U.S. Provisional Application No. 63/317,533, entitled "Ceramic Frequency Selective Surface" and filed on 7 Mar. 2022, which is hereby incorporated by reference in its entirety.

BACKGROUND

When a vehicle moves through the ionosphere, or when a hypersonic vehicle moves at very high velocities within the atmosphere, the vehicle becomes surrounded by ionized gases which form a plasma. The presence of the plasma layer causes attenuation of electromagnetic signals propagating through it. These signals may be associated with a variety of radio frequency (RF) transmissions such as those related to communications, telemetry, seeking/tracking, and use of a global positioning system (GPS). The attenuation increases as the thickness and density of the plasma surrounding the vehicle increase, eventually causing an RF blackout can last anywhere from tens of seconds to minutes depending on the trajectory and velocity of the vehicle.

Many approaches to ameliorate the RF blackout problem have been pursued, with only limited success. These include protruding antenna assemblies; magnetic windows, and the addition of quenchants to reduce the electron density or change chemical reaction rates. New methods and materials are needed that can improve communication via electromagnetic radiation with a vehicle traveling through the ionosphere or through the atmosphere at high speed.

SUMMARY

An all-ceramic frequency selective surface (ACFSS) material is provided for use in high temperature environments where there is a need for selective transmission of a defined wavelength band of electromagnetic radiation through the material. Unlike traditional frequency selective surfaces that use metals to form a structured or patterned layer that defines the passband, the present ACFSS material uses electrically conductive ceramic materials to form the patterned layer, giving the material a much greater heat stability than metal-containing frequency selective surface materials.

The invention can be further summarized through the following listing of embodiments.

1. An all-ceramic frequency selective surface (ACFSS) metamaterial comprising:
   - a first layer comprising an insulating ceramic material; and
   - a second layer, disposed on the first layer, and comprising a patterned electrically conductive ceramic material, wherein the pattern of the second layer provides a passband for electromagnetic radiation through the ACFSS.
2. The ACFSS of embodiment 1, wherein the ACFSS is stable at temperatures up to at least 900° C. Stability in this context refers to both structural and electronic properties. Loss of stability at temperatures of 900° C. or higher can be manifested as loss of conductivity. Structural stability is expected to remain robust at higher temperatures.
3. The ACFSS metamaterial of embodiment 1 or 2, wherein the electrical conductivity of the second layer is at least about $1\times10^5$ S/m.
4. The ACFSS metamaterial of any of the previous embodiments, wherein the insulating ceramic material is selected from materials listed in Table 1 and combinations thereof.
5. The ACFSS metamaterial of any of the previous embodiments, wherein the conductive ceramic material is selected from materials listed in Table 2 and combinations thereof.
6. The ACFSS metamaterial of any of the previous embodiments, wherein the material transmits electromagnetic radiation over a targeted frequency range that lies within a range from about 300 MHz to about 40 GHz.
7. The ACFSS metamaterial of embodiment 6, wherein said targeted frequency range includes a GPS signal frequency of 1.176 GHz.
8. The ACFSS metamaterial of embodiment 6 or 7, wherein the insulating material has a permittivity from about 5 to about 20 over the targeted frequency range.
9. The ACFSS metamaterial of embodiment 6 or 7, wherein the insulating material has a dielectric loss tangent from about 0.01 to about 0.0001 over the targeted frequency range.
10. The ACFSS metamaterial of any of the previous embodiments, wherein the insulating material has an operating temperature upper limit of about 1400° C. or higher.
11. The ACFSS metamaterial of any of the previous embodiments, wherein the insulating material has a flexure strength of about 500 MPa or greater.
12. The ACFSS metamaterial of any of the previous embodiments that is devoid of metal.
13. A radome comprising the ACFSS metamaterial of any of the previous embodiments.
14. A vehicle for flight through Earth's atmosphere at hypersonic velocity, the vehicle comprising the ACFSS metamaterial of any of embodiments 1-12.
15. The vehicle of embodiment 14, wherein the vehicle is selected from the group consisting of a space capsule, a spacecraft, a re-entry vehicle, a missile, a warhead, a satellite, a satellite launch vehicle, and an aircraft.
16. A method of communication with a supersonic or hypersonic vehicle, the method comprising:
   - (a) providing the vehicle of embodiment 14 or 15;
   - (b) transmitting a radio frequency signal to the vehicle, whereby a flight property of the vehicle is changed or maintained.

DETAILED DESCRIPTION

The present technology provides an all-ceramic frequency selective surface (ACFSS) stenciled using an electrically conductive ceramic material in a first layer that is disposed upon a second layer containing a non-conductive ceramic material.

Figure 1A:
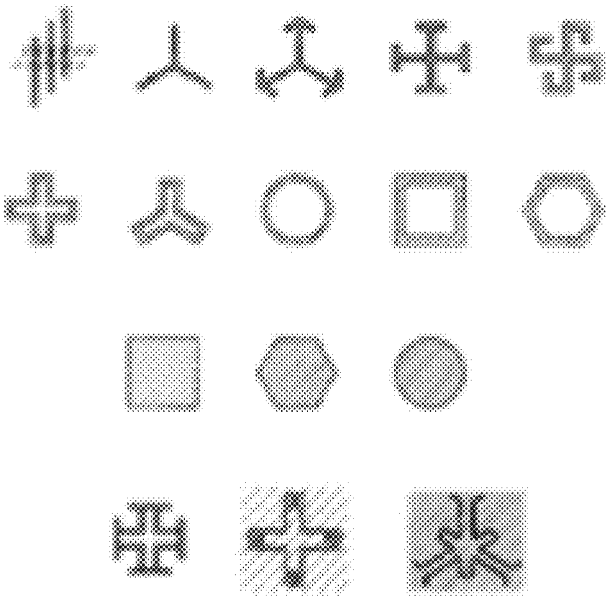
FIG. 1A shows the four major groups of FSS elements, including center connected or N-poles, loop types, solid interior or plate type, and combinations; prior art.
Figure 1B:
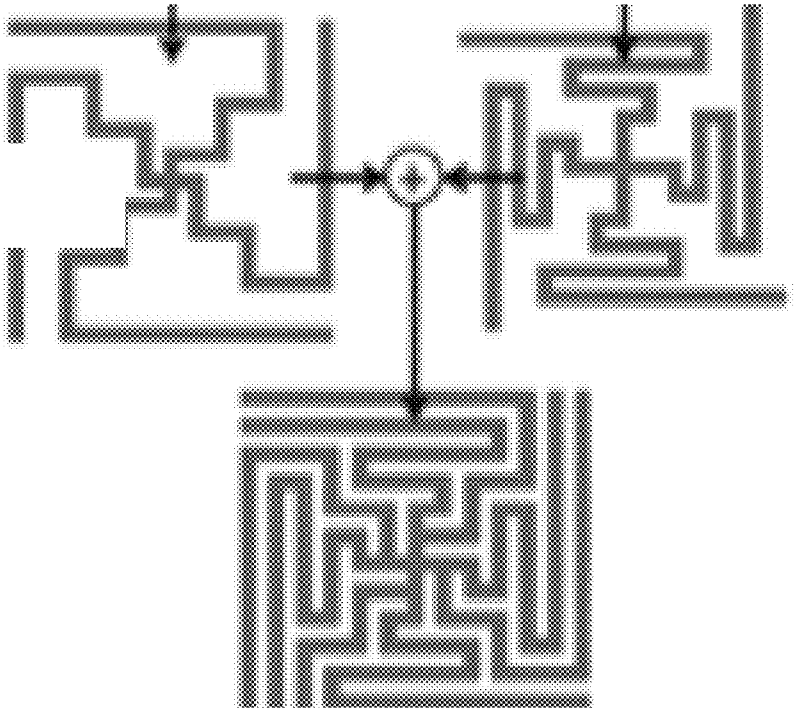
FIG. 1B shows dual band single layer FSS structures constructed from the basic crooked cross design; prior art.
Figure 1C:
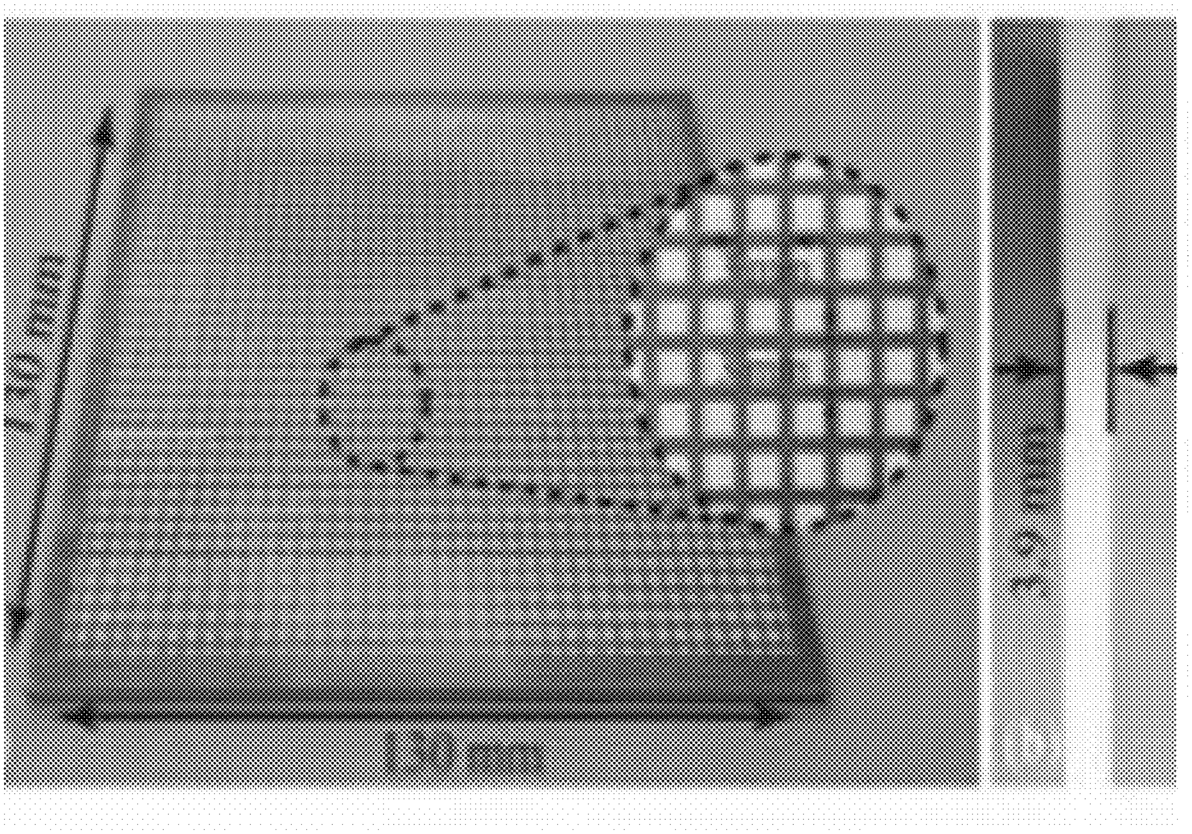
FIG. 1C shows a photograph of a FSS array of electromagnetic bandgap cells (EBG capacitive cells).
Figure 1D:
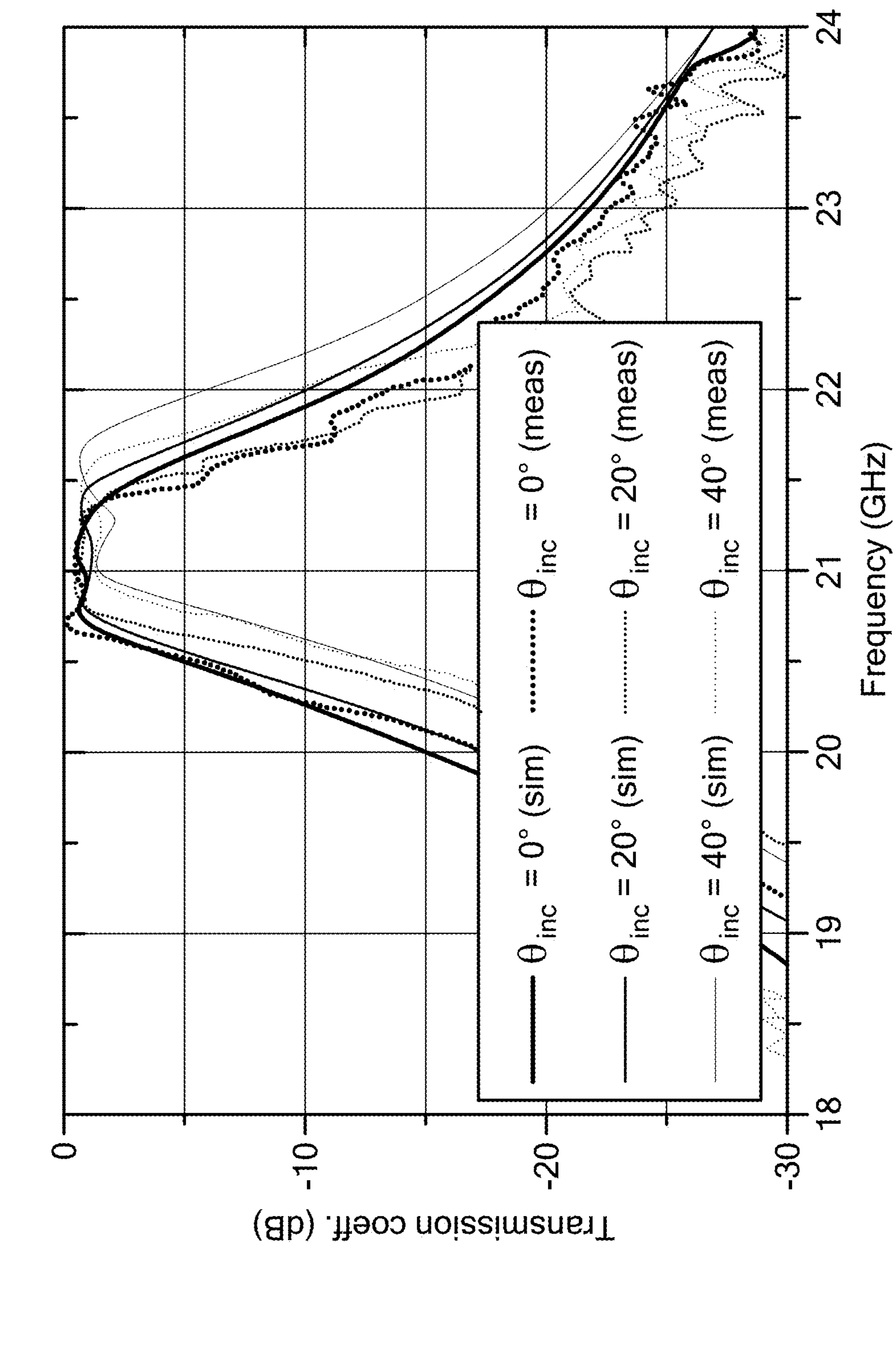
FIG. 1D shows a comparison between simulated and measured values of the FSS in FIG. 1C.
Figure 2A:
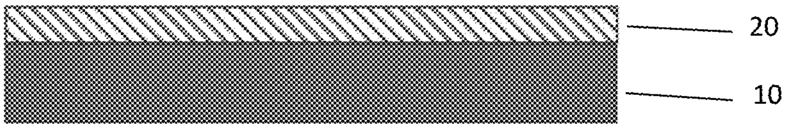
FIG. 2A shows a schematic cross-section of an all-ceramic frequency selective surface (ACFSS) according to the present invention. Base layer 10 comprises or consists of a non-conductive ceramic material, and top or patterned layer 20 comprises or consists of a conductive ceramic material having a structure (not shown) that renders it frequency selective in a desired range of the electromagnetic radiation spectrum.
Figure 2B:
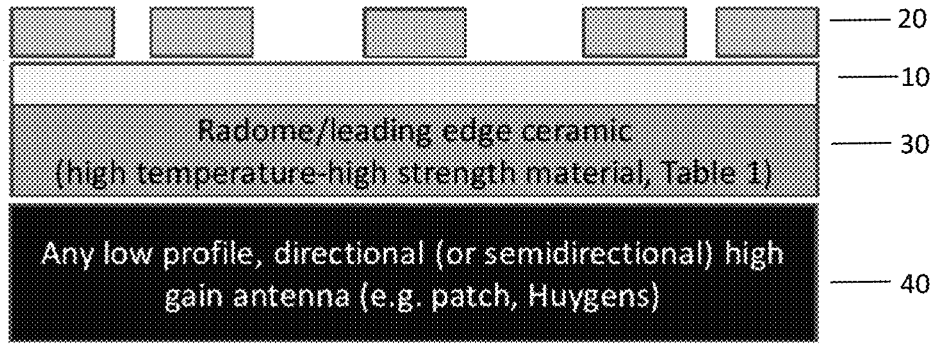
FIG. 2B shows a schematic representation of a cross-section of an embodiment of an ACFSS attached to radome or leading edge 30 below which is optional high gain antenna 40. The diagram components are not shown to relative scale, and the pattern in layer 20 is not representative of an actual pattern or intended in any way to be limiting. The radome or leading edge (30) can optionally serve as insulating layer 10. Antenna 40 can be low profile, directional, or semi-directional.

Frequency selective surfaces (FSS), also referred to herein as "metasurfaces", are surface material constructs that, when exposed to electromagnetic waves, allow electric currents to be excited in their unit cell elements that act as an electromagnetic source and produce a scattered field. The scattered field, along with incident fields, constitutes the total fields in the space around the FSS that manifest as a bandgap. As a result, the bandgap response required for an application can be generated based on design elements. The frequency behavior of the FSS can be determined by the distribution of the current upon the shape of the elements. FIG. 1A presents the four major groups of FSS elements, including center-connected or N-poles, loop types, solid interior or plate type, and combinations thereof. In FIG. 1B dual band single layer FSS constructs from the basic crooked cross unit cell are illustrated. FIG. 1C presents a photograph of an FSS capacitive patch array with simulated and measured (FIG. 1D) bandpass behavior at 21 GHz with a bandwidth of approximately 1 GHz having IL of approximately 2 dB and out-of-band rejection exceeding 20 dB.

The typical application of metamaterials, and specifically FSS, entails an assembly of split ring resonators in combination with wires and/or planes to act as lumped circuit elements (i.e., inductors and capacitors) that simulate complex permeability and permittivity. Selection of the appropriate unit cell sizes and geometries allow for the overlap in the frequency domain of negative regions of both u and & thus realizing a single structure manifesting as a negative index material (NIM).

The development of metamaterials, and specifically of negative index metastructures, can offer effective solutions. A matching μ-negative metasurface based on split-ring resonators (SRR) and wires and/or dielectric sheets used in concert with impedance tuned magnetoceramics has been described in published patent application US 2020/0119451 A1 for general use on radomes. In that work, a metastructure used in conjunction with a magnetoceramic radome having an impedance matched to the near field environmental impedance allows for the formation of a notchband at the frequency of interest for transmission of eletromagnetic signals for seeking/tracking, communication, telemetry, GPS, or other uses. SRR-based metastructures have been proposed for use on hypersonic platforms. SRR-based bulk metamaterials designed by pairing MNG (mu-negative) with ENG (epsilon-negative) metamaterial layers have been shown to lead to an effective medium through which electromagnetic waves will propagate. The developed MNG metasurfaces can be loaded with varactors to enable an adjustable resonance frequency that can be matched to an ENG (plasma) medium with a specific permittivity value. It has been demonstrated that these SRR-based metasurfaces can be tuned to maximize the field transmission through the resulting MNG-ENG plasma layered medium.

If an FSS is constructed based on such principles with a Huygens dipole antenna (or some other suitable directional or semi-directional high-gain antenna) placed behind it, the transmitted signal strength and cardioid-shaped pattern associated with the Huygens dipole antenna becomes an effective solution to the RF blackout problem, providing materials limitations can be overcome.

The principal limitation in employing this approach is imposed by the properties of component materials. To date, only metallic conductors, and in some limited demonstrations, dielectrics have been demonstrated. Yet, these materials must be able to withstand the extreme conditions experienced on the surface of space vehicles such as re-entry vehicles, missiles, satellites, and aircraft traveling at supersonic or hypersonic speeds. Solutions must reflect either suitable packaging or intrinsic properties that can withstand exposure to skin friction leading to high temperatures ($T_{surface}$>1500° C.), high pressures leading to the formation of a dense plasma, and mechanical abrasion and excessive dynamic loads. Conventional FSS materials would be readily ablated from the radome's surface. The use of protective coatings to mediate ablation has been shown to lead to excessive attenuation making the coating strategy ineffective.

Given the issues described above, the present inventor has developed an ACFSS solution, for which the intrinsic materials properties must serve both FSS functionality and withstand hypersonic blackout environmental conditions. Tables 1 and 2 present suitable materials for combining to make an ACFSS metamaterial. The materials have high temperature resistance, high flexure strength, and variable electrical conductivities.

Table 1 lists a sample collection of electrically insulating (or non-conductive), high-temperature, high strength materials that have a particularly high flexural strength modulus at temperatures suitable for conditions experienced by hypersonic vehicle surfaces. Such materials can be used to form the base layer or radome structure of the ACFSS. These materials include, for example, hot-pressed silicon nitride, SiC, $Yb_2O_3$, zirconium phosphate-bonded silicon nitride, and composites of related compounds. These materials can be optionally combined as composites or in other forms.

Table 2 lists another set of materials, which have oxide structures and are considered ceramic by materials science conventions, yet these compounds are conductors; some have very good conductivity, on the order of alloy metals. In contrast to these materials, most oxide ceramics are insulators, or at least poor electrical conductors. The materials in Table 2 can be used to form the patterned layer of the ACFSS, which can be deposited on a base layer formed using a material of Table 1 to form the ACFSS. It is understood that any material of Table 1 can be used as the base layer and combined with any desired material of Table 2 used to form the stencil layer. Further, it is understood that these materials are merely exemplary, and other materials having similar properties, particularly similar high temperature stability and electrical conductivity, can be used or combined instead of the materials in Table 1 and/or the materials of Table 2.

Electrical conduction in oxide materials include contributions from both electrons and ions, with the electron contribution being about 100-1,000 times larger than the ion contribution. Underlying physics informs that the large electron contribution derives from the delocalization of the electron wave function intrinsic to polarons. Hence, the control of polaron formation (or seeding) allows for the tailoring of conductivity. Ultimately, researchers have shown the ability to stabilize deep polarons by doping systems such as lanthanum manganese oxide with Sr (LSMO) or Ca (LCMO). Suitable conductive ceramic materials have been developed for use as high temperature ceramic electrodes for electrolyte fuel cells. Examples of preferred conductive ceramic materials for use in ACFSS metastructures include $La_{0.3}Sr_{1.7}TiMoO_6$ (conductivity of $1.3\times10^5$ S/m@~1,000 K), $RuO_2$ (conductivity of $6.6\times10^5$ S/m@727° C., and $IrO_2$ (conductivity of ~$5.0\times10^5$ S/m@727 K). Fabrication of oxide trace lines can be readily performed using pulsed laser deposition (see H. W. Choi, et al., Direct-write patterning of indium tin oxide film by high pulse repetition frequency femtosecond laser ablation, Appl Opt 46, 5792-5799 (2007).

TABLE 1

High Temperature-High Flexure Strength Materials for Use in ACFSS Metamaterials

| Material/ Tradename | Max. Oper. Temp. (° C.) | Flexural Strength (MPa) | Ref. |
|---|---|---|---|
| Pyroceram 9606 ($LiAl(SiO_3)_2$, Corning) | 1000 | 240 | As reported in: Taylor Kenion, Ni Yang, Chengying Xu, Dielectric and mechanical properties of hypersonic radome materials and metamaterial design: A review, Journal of the European Ceramic Society, Volume 42, Issue 1, 2022, Pages 1-17 |
| SCFS (spin or slip-cast fused silica, $SiO_2$) | 1540 | 44 | |
| Rayceram 8 ($Mg_2Al_4Si_5O_{18}$, Raytheon) | 1250 | 131 | |
| RBSN (reaction-bonded silicon nitride, Boeing) | 1540 | 53 | |
| HPSN (hot-pressed silicon nitride, Norton and Ceradyne) | 1540 | 350 | |
| Nitroxyceram ($Si_3N_4$—BN—$SiO_2$ composite, Loral Aerospace) | 1540 | 106 | |
| Celsian (Navy Surface Warfare Center) | 1370 | 103 | |
| $AlPO_4$—$SiO_2$ | 1400 | 168 | |
| BN | 800 | 100 | |
| SiC | 1600 | 450 | R. G. Munro, Material Properties of a sintered a-SiC, J. Phys. Chem. Ref. Data, 26, 5 1997, 1195 |
| $(SiC)_{0.15}(HfB_2)_{0.85}$ | 1000 | 452 | SANDIA REPORT SAND 2006-2925 Unlimited |
| $(SiC)_{0.02}(ZrB_2)_{0.98}$ | 600 | 470 | Release Printed June 2006 Ultra High Temperature Ceramics for Hypersonic Vehicle Applications Ronald Loehman, Erica Corral, Hans Peter Dumm, Paul Kotula, and Rajan Tandon |
| $Yb_2O_3$ | 1400 | 870 | Huiyong Yang, Xingui Zhou, Jinshan Yu, Honglei Wang, Zelan Huang, Microwave and conventional sintering of SiC/SiC composites: Flexural properties and microstructures, Ceramics International, Volume 41, Issue 9, Part B, 2015, 11651-11654 |
| Zr—PBSN (zirconium phosphate-bonded silicon nitride) | 1500 | 71.6 | Nondestructive Evaluation of Zirconium Phosphate Bonded Silicon Nitride Radomes, J.A. Medding, Doctoral dissertation, Virginia Tech (1996) |

TABLE 2

High Temperature-Electrically Conducting Ceramic Materials for Use in ACFSS Metamaterials

| Material/ Tradename | Max. Oper. Temp. (° C.) | Conductivity (S/m) | Ref. |
|---|---|---|---|
| Copper | RT | $5.8\times10^7$ S/m | https://www.copper.org/publications/newsletters/innovations/2001/08/intro_fac.html |
| $La_{0.3}Sr_{1.7}TiMoO_6$ | 950 | $1.3\times10^5$ S/m | M. Saxena and T. Maiti, Dalton Trans., 2017, 46, 5872 |
| $(La_{0.75}Sr_{0.25})Cr_{0.5}Ti_{0.5}O_{3-\delta}$ | 700 | 6,300 S/m | Wang Hay Kan, V. Thangadurai, Ionics (2015) 21: 301-318 |
| $(La_{0.3}Sr_{0.7})Co_{0.07}Ti_{0.93}O_{3-\delta}$ | 900 | 3,800 S/m | |
| $(La_{0.3}Sr_{0.7})TiO_{3-\delta}$ | 700 | 24,700 S/m | |
| $Sr_2MgMoO_{6-\delta}$ | 800 | 1,000 S/m | |
| $(La_{0.3}Sr_{0.7})(Sc_{0.1}Ti_{0.9})O_{3-\delta}$ | 800 | 4,900 S/m | |

TABLE 2-continued

High Temperature-Electrically Conducting Ceramic Materials for Use in ACFSS Metamaterials

| Material/ Tradename | Max. Oper. Temp. (° C.) | Conductivity (S/m) | Ref. |
|---|---|---|---|
| $CeO_{2-\delta}$ | 1000 | 200 S/m | M Mogensen, N M. Sammes, G A. Tompsett, Solid State Ionics, 129, 1-4, 2000, 63-94 |
| $(CeO_2)_{0.9}(CaO)_{0.1}$ | 1000 | 20 S/m | $CeO_2$ Fract Toughness 1.5 MPa S. Mashino, O. Sbaizero, S. Meriani, J. Eur. Ceram. Soc. |
| $(CeO_2)_{0.9}(SrO)_{0.1}$ | 1000 | 20 S/m | 9 (1992) 127 |
| $RuO_2$ | 526 | 83,300 S/m | Steeves, Michael M., Electronic Theses |
| $RuO_2$ | 526 | $1.72\times10^5$ S/m | and Dissertations. 262 (2011). |
| $RuO_2$ | 526 | $2.86\times10^5$ S/m | Performance varies due to processing. |
| $RuO_2$ | 526 | $5.00\times10^5$ S/m | |
| $RuO_2$ | 727 | $6.66\times10^5$ S/m | K. M. Glassford and J. R. Chelikowsky, Phys. Rev. B., 49, 11 7101, 1994. |
| $IrO_2$ | 727 | $\sim5.00\times10^5$ S/m | W. D. Ryden, A. W. Lawson, and C. C. Sartain, Phys. Lett. 26A, 209 (1968); Phys. Rev. B1, 1494 (1970). |

US Published Patent Application No. US 2020/0119451 A1, "Magnetodielectric Metamaterials and Articles Including Magnetodielectric Metamaterials", is hereby incorporated by reference in its entirety.

REFERENCES

1. Kim, M.; Keidar, M.; Boyd, I.D. Analysis of an electromagnetic mitigation scheme for reentry telemetry through plasma. J. Spacecr. Rockets 2008, 45, 1223-1229.
2. Schroeder, L. C.; Russo, F. P. Flight Investigation and Analysis of Alleviation of Communications Blackout by Water Injection during Gemini 3 Reentry; NASA TM X-1521; Technical Report; NASA: Washington, DC, USA, 1968.
3. Minseok, J.; Kihara, H.; Abe, K.-I.; Takahashi, Y. Reentry blackout prediction for atmospheric reentry demonstrator mission considering uncertainty in chemical reaction rate model. Phys. Plasmas 2018, 25, 013507
4. Pendry, J. B.; Holden, A. J.; Robbins, D. J.; Stewart, W. J. Low frequency plasmons in thin-wire structures. J. Phys. Condens. Matter 1998, 10, 4785-4809
5. Engheta, N.; Ziolkowski, R. W. Introduction, History, and Selected Topics in Fundamental Theories of Metamaterials. In Metamaterials Physics and Engineering Explorations, 1st ed.; IEEE Press: Piscataway, NJ, USA, 2006; pp. 5-9
6. Hou-Tong Chen, Antoinette J Taylor, and Nanfang Yu, "A review of metasurfaces: physics and applications," 2016 Rep. Prog. Phys. 79 076401
7. R. Panwar and J. R. Lee, "Progress in frequency selective surface-based smart electromagnetic structures: A critical review," Aerospace Science and Technology, 66 (2017) 216-234.

What is claimed is:

1. An all-ceramic frequency selective surface (ACFSS) metamaterial comprising:

a first layer comprising an insulating ceramic material; and a second layer, disposed on the first layer, and comprising a patterned electrically conductive ceramic material, wherein the pattern of the second layer provides a passband for electromagnetic radiation through the ACFSS.

2. The ACFSS of claim 1, wherein the ACFSS is stable at temperatures up to 900° C.

3. The ACFSS metamaterial of claim 1, wherein the electrical conductivity of the second layer is at least $1\times10^5$ S/m.

4. The ACFSS metamaterial of claim 1, wherein the insulating ceramic material is selected from Pyroceram 9606 ($LiAl(SiO_3)_2$), SCFS (spin or slip-cast fused silica, $SiO_2$), Rayceram 8 ($Mg_2Al_4Si_5O_{18}$), RBSN (reaction-bonded silicon nitride), HPSN (hot-pressed silicon nitride), Nitroxyceram ($Si_3N_4$—BN—$SiO_2$ composite), Celsian, $AlPO_4$—$SiO_2$, BN, SiC, $(SiC)_{0.15}(HfB_2)_{0.85}$, $(SiC)_{0.02}(ZrB_2)_{0.98}$, $Yb_2O_3$, Zr—PBSN (zirconium phosphate-bonded silicon nitride) and combinations thereof.

5. The ACFSS metamaterial of claim 1, wherein the conductive ceramic material is selected from $La_{0.3}Sr_{1.7}TiMoO_6$, $(La_{0.75}Sr_{0.25})Cr_{0.5}Ti_{0.5}O_{3-\delta}$, $(La_{0.3}Sr_{0.7})Cr_{0.07}Ti_{0.93}O_{3-\delta}$, $(La_{0.3}Sr_{0.7})TiO_{3-\delta}$, $Sr_2MgMoO_{6-\delta}$, $(La_{0.3}Sr_{0.7})(Sc_{0.1}Ti_{0.9})O_{3-\delta}$, $CeO_{2-\delta}$, $(CeO_2)_{0.9}(CaO)_{0.1}$, $(CeO_2)_{0.9}(SrO)_{0.1}$, $RuO_2$, $IrO_2$, and combinations thereof.

6. The ACFSS metamaterial of claim 1, wherein the material transmits electromagnetic radiation over a targeted frequency range that lies within a range from 300 MHz to 40 GHz.

7. The ACFSS metamaterial of claim 6, wherein said targeted frequency range includes a GPS signal frequency of 1.176 GHz.

8. The ACFSS metamaterial of claim 6, wherein the insulating material has a permittivity from 5 to 20 over the targeted frequency range.

9. The ACFSS metamaterial of claim 6, wherein the insulating material has a dielectric loss tangent from 0.01 to 0.0001 over the targeted frequency range.

10. The ACFSS metamaterial of claim 1, wherein the insulating material has an operating temperature upper limit of 1400° C. or higher.

11. The ACFSS metamaterial of claim 1, wherein the insulating material has a flexure strength of 500 MPa or greater.

12. The ACFSS metamaterial of claim 1 that is devoid of metal.

13. A radome comprising the ACFSS metamaterial of claim 1.

14. A vehicle for flight through Earth's atmosphere at hypersonic velocity, the vehicle comprising the ACFSS metamaterial of claim 1.

15. The vehicle of claim 14, wherein the vehicle is selected from the group consisting of a space capsule, a spacecraft, a re-entry vehicle, a missile, a warhead, a satellite, a satellite launch vehicle, and an aircraft.

16. A method of communication with a supersonic or hypersonic vehicle, the method comprising:

(a) providing the vehicle of claim 14;

(b) transmitting a radio frequency signal to the vehicle, whereby a flight property of the vehicle is changed or maintained.

* * * * *